United States Patent [19]

Sato et al.

[11] 4,164,675

[45] Aug. 14, 1979

[54] ROTOR OF CORELESS MOTOR AND METHOD OF MANUFACTURING SAME

[75] Inventors: Masaaki Sato, Hachioji; Shinya Kosaka, Tama, both of Japan

[73] Assignee: Olympus Optical Company, Ltd., Tokyo, Japan

[21] Appl. No.: 828,679

[22] Filed: Aug. 29, 1977

[30] Foreign Application Priority Data

Oct. 19, 1976 [JP] Japan ................................ 51/125791
Oct. 19, 1976 [JP] Japan ................................ 51/125792

[51] Int. Cl.² ............................................. H02K 7/04
[52] U.S. Cl. ..................................... 310/268; 29/597; 29/598; 264/272; 264/277; 310/43; 310/266
[58] Field of Search ...................... 29/596, 598, 597; 310/43, 268, 266; 264/272, 275, 277, 278

[56] References Cited

U.S. PATENT DOCUMENTS

| 1,917,929 | 7/1933 | Duffy | 264/277 |
| 3,863,336 | 2/1975 | Noto et al. | 29/598 X |
| 3,993,920 | 11/1976 | Sato | 310/268 X |
| 4,080,544 | 3/1978 | Aoki | 310/268 |

*Primary Examiner*—Carl E. Hall
*Attorney, Agent, or Firm*—Lerner, David, Littenberg & Small

[57] ABSTRACT

A rotor is manufactured by disposing a commutator integral with a rotary shaft centrally within a casting jig, arranging a rotor coil around the commutator, and integrally molding the assembly in synthetic resin. The rotor coil comprises a coil wound on a bobbin formed with positioning openings. Guide pins are provided within the jig in the region of the rotor coil for fitting engagement with the positioning openings in the latter. When molding the rotor, the rotor coil is properly positioned as a result of the engagement between the guide pins and the mating openings, assuring the molding of a balanced rotor.

6 Claims, 12 Drawing Figures

U.S. Patent  Aug. 14, 1979  Sheet 1 of 3  4,164,675
FIG. 1
PRIOR ART
FIG. 2
PRIOR ART
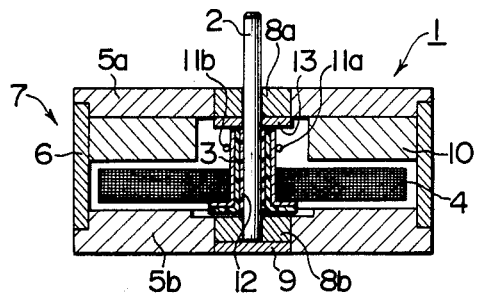
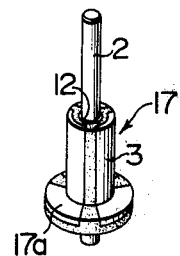
FIG. 3
PRIOR ART
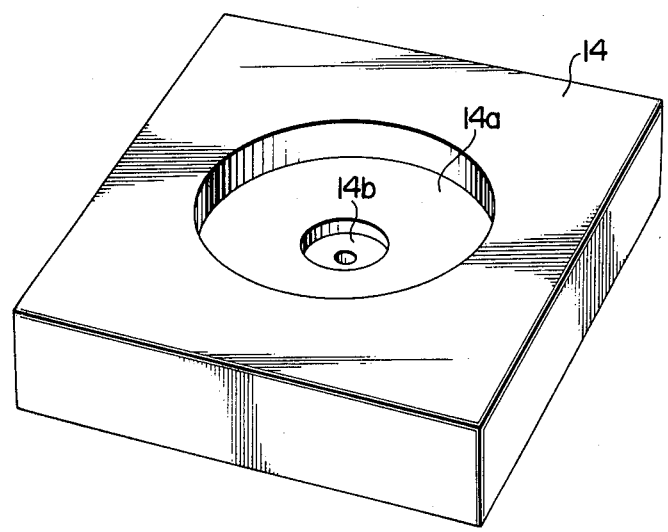
FIG. 4
PRIOR ART
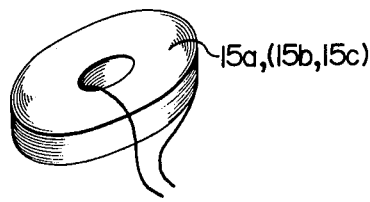
FIG. 5
PRIOR ART
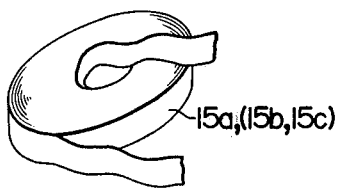

ROTOR OF CORELESS MOTOR AND METHOD OF MANUFACTURING SAME

BACKGROUND OF THE INVENTION

The invention relates to a rotor of a coreless motor, and more particularly, to a rotor of coreless motor having a rotor coil which is balanced about a rotary shaft, and to a method of manufacturing same.

The requirements for a coreless motor, in particular, that one used in a small size tape recorder, are a consistent rotation at uniform rate in a smooth and stable manner free from non-uniformity in its rotation. This requires that the rotor be dynamically balanced with respect to the rotary shaft. A conventional coreless motor is manufactured by manually placing the coil in a suitable position through the use of a jig, and molding the assembly in a casting material to form the rotor. This involves extreme difficulties to achieve the desired dynamic balance.

Referring to FIGS. 1 to 3, a conventional arrangement with three coils will be described. A coreless motor 1 includes a housing 7 which is formed by a hollow cylinder 6 and a pair of upper and lower end plates 5a, 5b secured to the opposite ends of the cylinder and serving as yokes. A pair of bearings 8a, 8b are fitted centrally in each end plate 5a, 5b for rotatably receiving a rotary shaft 2. A rotor 4 is integrally coupled with the rotary shaft 2 and includes a commutator 3 and rotor coils 15a, 15b, 15c (see FIG. 6). The lower end of the shaft 2 bears against an abutment plate 9 which is secured to the end plate 5b below the bearing 8b while the upward thrust of the shaft is counteracted by the abutment of the upper end face of the commutator 3 against the lower end face of the upper bearing 8a through a spacer 13 interposed therebetween. A magnet 10 is fixedly mounted within the housing 7 so as to be opposite to the upper surface of the rotor 4, and a pair of stationary brushes 11a, 11b are fixedly mounted on the housing 6 for contact with the commutator 3.

The rotor 4 of such a conventional coreless motor is manufactured by the following steps: initially, an assembly 17 shown in FIG. 2 is prepared by bonding the rotary shaft 2 and the commutator 3 together with an adhesive 12. The lower end of the assembly 17 is formed with a flange 17a. A casting jig 14 is used to join the coils 15a to 15c with the assembly 17, and has a recess 14a formed in its upper surface which is of the same configuration as the rotor 4, with a fitting opening 14b formed centrally in the bottom of recess 14a for fitting engagement with the flange 17a of the assembly. Opening 14c receives the bottom end of shaft 2. After fitting the flange 17a into the opening 14b, the ends of the coils 15a to 15c are connected, as by soldering, with the commutator 3 and placed within the jig 14 as shown in FIG. 6. As shown in FIGS. 4 and 5, the coils are formed of conductive wires or bands without a bobbin. Then a casting material 40 such as epoxy resin, for example, is poured into the recess of jig 14, which is heated to have the assembly bonded together. When the resin is set, the entire assembly may be removed from the jig 14 to provide a rotor 4 as shown in FIG. 1 which is complete with rotary shaft 2 and commutator 3. To achieve a dynamic balance of the rotor 4 with respect to the rotary shaft 2, the coils 15a to 15c must be disposed within the jig 14 so as to maintain an equal spacing between them and a uniform distribution. Because the disposition is a manual operation, extreme care must be exercised in positioning the coils while avoiding any movement thereof, requiring a considerable length of time. Still, the positioning cannot be satisfactory, causing an imbalance to the rotor which presents an impediment to the smooth rotation of the rotor.

To overcome such difficulty, there is proposed the use of guide pins secured to the interior of the jig and which can be directly engaged with the coils to position them. However, this renders the release of the molded assembly from the jig difficult since the resin which extends into the coils is adhesively bonded with the pins. In addition, if the next set of rotor coils are attached to the guide pins before the jig cools down from the heating step used to set the resin, the coating of the coil winding may be damaged by the guide pins.

SUMMARY OF THE INVENTION

It is a first object of the invention to provide a rotor for a coreless motor and a method for manufacturing same in which coils are formed on bobbin which are provided with positioning openings adapted to fit on positioning pins of a casting jig before pouring a casting material into the jig to fix the parts in position.

With the present invention, damage to the coating of the coil winding upon release is avoided through the use of a simple construction wherein the coil bobbins are formed with positioning openings adapted to fit on positioning pins on the jig. By engaging the positioning openings with the positioning pins, the coils can be reliably located around the rotary shaft in a manner to yield a dynamically balanced rotor assembly.

It is a second object of the invention to provide the rotor of a coreless motor described above in which the positioning pins and the positioning openings are both tapered to facilitate the fitting and the release of the molded assembly from the jig.

BRIEF DESCRIPTION OF THE DRAWINGS

FIG. 1 is a longitudinal section of a coreless motor having a conventional rotor;

FIG. 2 is a perspective view of an assembly comprising a rotary shaft and a commutator shown in FIG. 1;

FIG. 3 is a perspective view of a casting jig used in the manufacture of the rotor shown in FIG. 1;

FIGS. 4 and 5 are perspective views of exemplary rotor coils;

DESCRIPTION OF PREFERRED EMBODIMENT

Figure 6:
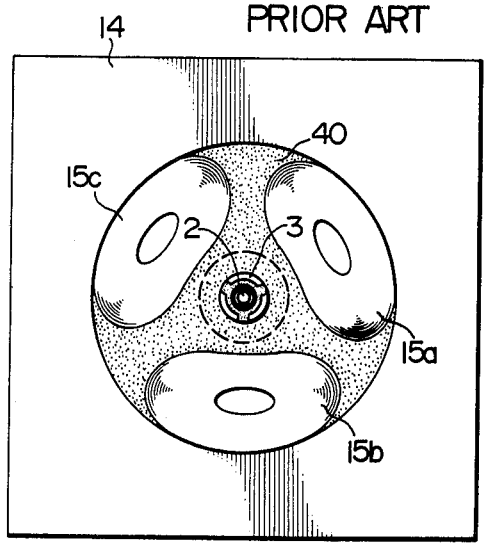
FIG. 6 is a plan view of the jig shown in FIG. 3 with coils disposed therein.
Figure 7:
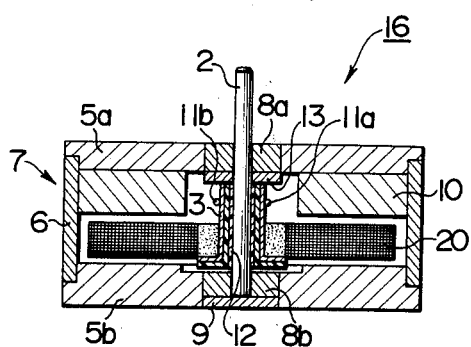
FIG. 7 is a longitudinal section of a coreless motor having a rotor manufactured in accordance with the invention.

Referring to FIG. 7, there is shown a coreless motor 16 having a rotor of the invention incorporated therein. In this Figure, parts other than rotor 20 are quite similar to those described in connection with FIGS. 1 to 6 and are designated by like reference numerals as before without repeating their description. In the embodiment shown, the coreless motor has three poles and hence three coils, but it should be understood that the invention is not limited to rotor assemblies having any specific number of coils.

Figure 8:
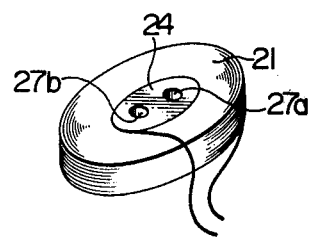
FIG. 8 is a perspective view, to an enlarged scale, of one of rotor coils used in the rotor of the invention.
Figure 9:
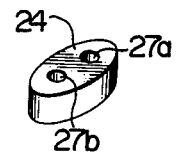
FIG. 9 is a perspective view, to an enlarged scale, of a coil bobbin.

As shown in FIG. 8, a rotor coil used in the invention comprises a winding on a bobbin 24 which may be molded from a plastic material. As clearly shown in FIG. 9, the bobbin 24 is formed with a pair of positioning openings 27a, 27b which extend vertically therethrough and which are adapted to fit with guide pins 37a, 37b (see FIG. 10) on a casting jig to be described below.

Figure 10:
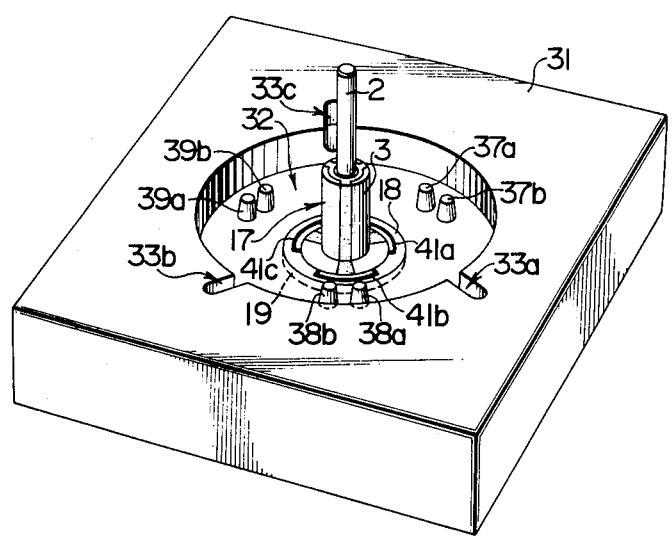
FIG. 10 is a perspective view of a casting jig used in the manufacture of the rotor according to the invention.

A casting jig 31 which is used to cast the rotor 20 is formed with a recess 32 of the same configuration as the rotor in its upper surface as illustrated in FIG. 10, and is also formed with a fitting opening 19, shown in dotted lines, centrally in its bottom. A flange 18 of the assembly 17 comprising the shaft 2 and the commutator 3 bonded together with an adhesive 12 (see FIG. 7) is fitted into the opening 19. Arcuate shaped resistors 41a to 41c are connected between the commutator segments of the flange 18 for preventing sparks. A plurality of guide pins 37a, 37b; 38a, 38b; 39a, 39b are fixedly mounted on the bottom surface of the recess 32 for engaging with positioning openings 27a, 27b; 28a, 28b; 29a, 29b; respectively, formed in the respective coil bobbins 24 to 26 in order to locate the individual coils 21 to 23 at their optimum positions.

Figure 12:
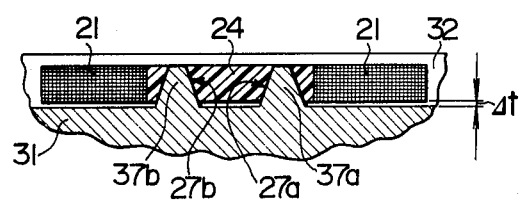
FIG. 12 is an enlarged fragmentary section taken along the line XII—XII shown in FIG. 11.

In the embodiment shown, there are a pair of positioning openings and a pair of guide pins associated with each coil, it should be understood that the pair of openings and the pair of pins may be replaced by a single square opening and a single square-pillar pin, respectively. Alternatively, the number of these openings and pins may be greater than two for each coil. In the embodiment shown, these guide pins and positioning openings are tapered. By way of example, considering the coil 21 which is shown in section in FIG. 12, the guide pins 37a, 37b are both tapered pins while the mating openings 27a, 27b are tapered openings of complementary form. The bottom ends of guide pins 37a, 37b have a diameter greater than that of the larger diameter positioning openings 27a, 27b so that the lower extremity of the coil 21 is spaced above the bottom surface of the recess 32 in the jig 31 as illustrated by a clearance Δt when the openings are engaged with the pins to thereby define a gap space. The tapered configuration facilitates the fitting operation and assures a reliable positioning, while the provision of the aforesaid clearance permits the casting material to flow into the gap space, thus protecting the coating of the coil 21.

Figure 11:
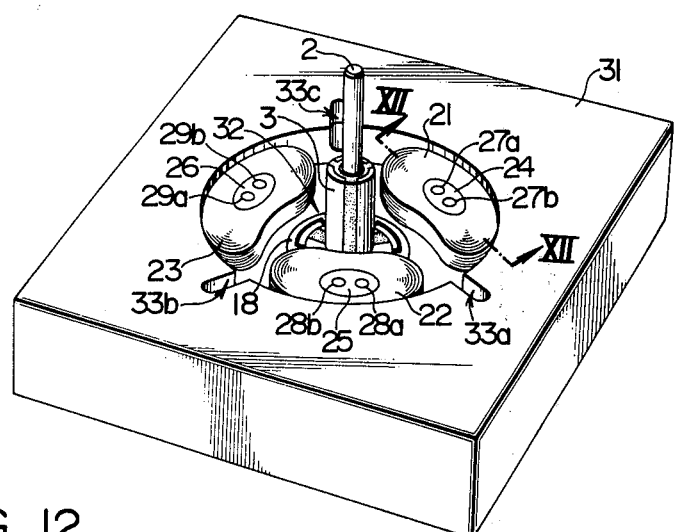
FIG. 11 is a perspective view of the jig shown in FIG. 10 with rotor coils disposed therein.

Describing the procedure to manufacture the rotor 20 by using the casting jig 31, the flange 18 of the assembly 17 is initially fitted into the central opening 19 in the recess 32 of the jig 31 as shown in FIG. 10. Next, the lead wires of the coils 21 to 23 are soldered or otherwise secured to the respective commutator segments, followed by fitting the positioning openings 27a to 29b of the bobbins 24 to 26 over the guide pins 37a to 39b, respectively. Such an intermediate condition is shown in FIG. 11. A jig in the form of a flat plate (not shown) is then placed over the jig 31, and a synthetic resin casting material such as epoxy resin is poured into gates 33a to 33c. The entire assembly is heated to cause the casting material to be set, whereupon the heating is terminated. After solidification of the casting material, the rotor 20 is removed from the jig 31. During the removal or release, the coating of the coil conductor is protected against damage since both the upper and lower end faces of the coil 21 (as well as other coils 22 and 23) are covered with the casting material. The described procedure enables a rotor to be produced in which the coils are positioned to achieve a dynamically balanced rotor assembly.

While the rotor has been formed by casting in the above description, the injection molding process may be utilized as well and is covered by the present invention.

What is claimed is:

1. A method of manufacturing a rotor of a coreless motor by placing a commutator integral with a rotary shaft centrally within a casting jig, disposing rotor coils around the commutator, and casting a synthetic resin into the jig to integrally mold the rotor, characterized by the steps of forming the rotor coils on individual bobbins having positioning openings, providing the jig with guide pins therein in the region of the rotor coils, fixedly disposing the rotor coils in the jig by fitting the openings on the guide pins, and subsequently casting the rotor coils integrally with the rotary shaft and the commutator in a casting material to form a balanced rotor.

2. The method of manufacturing a rotor of a coreless motor of claim 1 wherein said step of forming the rotor coils on individual bobbins having positioning openings includes providing bobbins whose positioning openings are tapered into complementary form with respect to said jig guide pins.

3. The method of manufacturing a rotor of a coreless motor of claim 2 wherein said step of providing the jig with guide pins includes providing guide pins having a diameter adjacent to their base end which is greater than the diameter of the adjacent end of said positioning openings in said bobbin so as to space said bobbins and rotor coils from said casting jig.

4. A rotor of a coreless motor which is manufactured by placing a commutator integral with a rotary shaft centrally within a casting jig, disposing rotor coils around the commutator, and casting a synthetic resin into the jig to form a cast rotor, wherein said rotor coils are each preformed on a bobbin having positioning openings, said casting jig being provided with guide pins therein in the region of said rotor coils, said positioning openings of said bobbins being fitted on said guide pins thereby mounting and positioning said rotor coils relative to the jig without said jig or guide pins touching said rotor coils, said coils after release of said rotor from said jig being completely encapsulated by the combination of the cast synthetic resin and said bobbin.

5. A rotor according to claim 4 in which both said positioning openings and said guide pins are tapered into complementary form.

6. A rotor according to claim 5 in which said guide pins have a diameter adjacent to its base end which is greater than the diameter of the adjacent end of said positioning openings in said bobbin.

* * * * *